United States Patent
Wu et al.

(10) Patent No.: US 10,022,968 B2
(45) Date of Patent: Jul. 17, 2018

(54) PRINTING PLATE ASSEMBLY AND METHOD FOR AN INK JET PRINT HEAD ASSEMBLY

(71) Applicant: Illinois Tool Works Inc., Glenview, IL (US)

(72) Inventors: Yufeng Wu, Brookfield, CT (US); Tzer-Yi Chen, Brookfield, CT (US)

(73) Assignee: Illinois Tool Works Inc., Glenview, IL (US)

(*) Notice: Subject to any disclaimer, the term of this patent is extended or adjusted under 35 U.S.C. 154(b) by 498 days.

(21) Appl. No.: 14/468,773

(22) Filed: Aug. 26, 2014

(65) Prior Publication Data
US 2015/0115070 A1   Apr. 30, 2015

Related U.S. Application Data

(60) Provisional application No. 61/896,194, filed on Oct. 28, 2013.

(51) Int. Cl.
*B23K 13/01* (2006.01)
*B23K 1/002* (2006.01)
(Continued)

(52) U.S. Cl.
CPC ............ *B41J 2/162* (2013.01); *B23K 1/002* (2013.01); *B23K 1/0008* (2013.01); *B41J 2/14* (2013.01);
(Continued)

(58) Field of Classification Search
CPC .... B41J 2/14024; B41J 2/1603; B41J 2/1623; B41J 2/162; B41J 2/14; B41J 2/1609;
(Continued)

(56) References Cited

U.S. PATENT DOCUMENTS 4,883,219 A * 11/1989 Anderson ............. B41J 2/1617
  228/175
5,479,684 A   1/1996 Murphy
(Continued)

FOREIGN PATENT DOCUMENTS

JP         01188348 A      7/1989

OTHER PUBLICATIONS

ISR and WO for PCT/US2014/062033 dated Mar. 31, 2015 (10 pgs.).

*Primary Examiner* — Hung D Nguyen
(74) *Attorney, Agent, or Firm* — Christopher R. Carroll; The Small Patent Law Group LLC

(57) ABSTRACT

A method (e.g., for creating a printing plate assembly of an ink jet print head assembly) includes coating one or more sides of plural planar subsection plates with a bonding material. The subsection plates include printing holes through which a fluid is to be ejected from the ink jet print head assembly. The method also includes placing the subsection plates of the printing plate assembly against each other with the printing holes axially aligned with each other and heating the bonding material between the subsection plates such that the subsection plates are affixed to each other. The subsection plates are coupled with each other to form a chamber printing assembly that is coupled to the ink jet print head assembly that prints fluid onto one or more objects by ejecting the fluid out of the printing holes of the subsection plates. The subsection plates may be hermetically bonded to each other by inductively heating the assembly.

14 Claims, 5 Drawing Sheets

(51) Int. Cl.
  *B41J 2/16* (2006.01)
  *B23K 1/00* (2006.01)
  *B41J 2/14* (2006.01)
  *B23K 101/04* (2006.01)

(52) U.S. Cl.
  CPC ......... *B41J 2/14024* (2013.01); *B41J 2/1603* (2013.01); *B41J 2/1623* (2013.01); *B23K 2201/04* (2013.01)

(58) Field of Classification Search
  CPC ...... B41J 2/1632; B41J 2/1642; B41J 2/1643; B41J 2/1636; B23K 1/0008; B23K 1/002; B23K 35/0272; B21B 15/0085
  USPC .... 219/609, 615, 616, 617, 603; 347/20, 47, 347/66, 71, 117, 127, 166, 205
  See application file for complete search history.

(56) References Cited

U.S. PATENT DOCUMENTS

| | | |
|---|---|---|
| 6,464,324 B1 | 10/2002 | Le et al. |
| 6,530,653 B2 | 3/2003 | Le et al. |
| 6,783,213 B2 | 8/2004 | Le et al. |
| 6,928,731 B2 | 8/2005 | Le et al. |
| 2002/0060724 A1* | 5/2002 | Le ............................ B23K 1/06 347/71 |
| 2006/0209127 A1 | 9/2006 | Inoue |
| 2008/0036824 A1 | 2/2008 | Ishikawa |
| 2008/0309735 A1* | 12/2008 | Watanabe .............. B41J 2/1609 347/71 |
| 2012/0229571 A1* | 9/2012 | Oosugi ................ B41J 2/14233 347/47 |
| 2013/0222486 A1 | 8/2013 | Nystrom |

\* cited by examiner

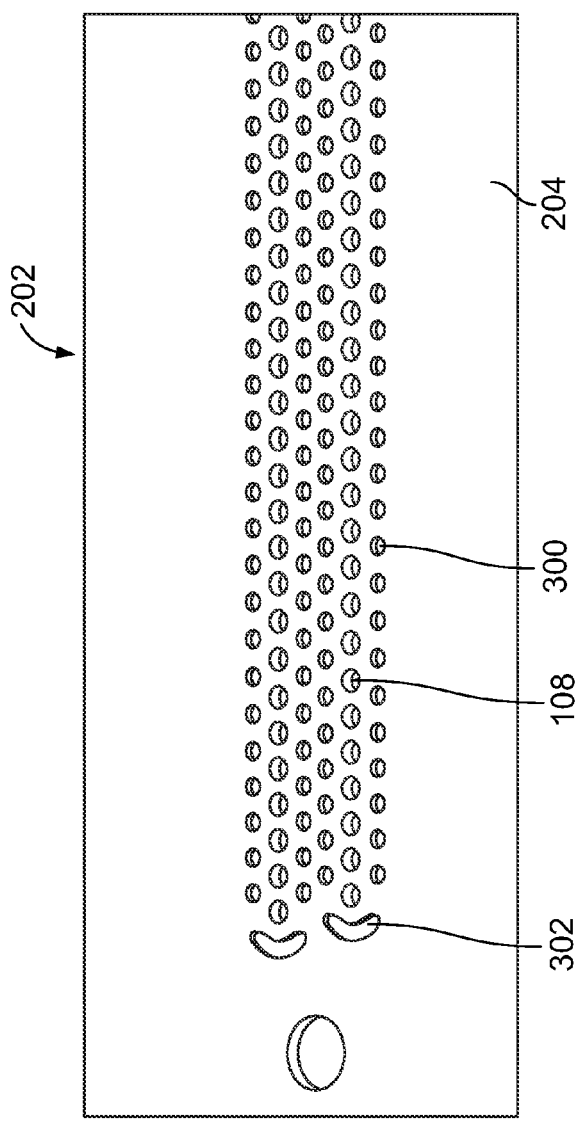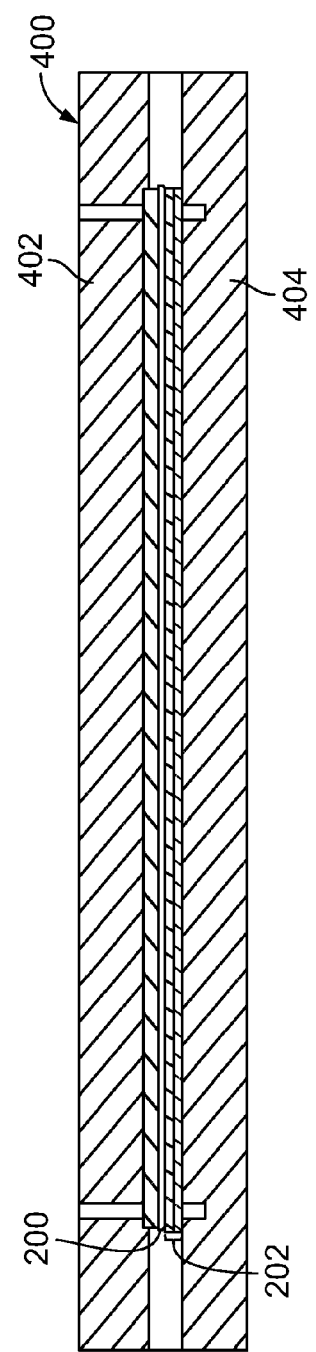

PRINTING PLATE ASSEMBLY AND METHOD FOR AN INK JET PRINT HEAD ASSEMBLY

CROSS-REFERENCE TO RELATED APPLICATIONS

This application claims priority to U.S. Provisional Application Ser. No. 61/896,194, which was filed on 28 Oct. 2013, and the entire disclosure of which is incorporated herein by reference.

BACKGROUND

Embodiments of the inventive subject matter described herein relate to ink jet printing assemblies.

BRIEF DESCRIPTION

In one embodiment, a method (e.g., for creating a printing plate assembly of an ink jet print head assembly) includes coating one or more sides of plural planar subsection plates with a bonding material. The subsection plates include printing holes through which a fluid is to be ejected from an ink jet print head assembly. The method also includes placing the subsection plates of the printing plate assembly against each other with the printing holes axially aligned with each other and heating the bonding material between the subsection plates such that the subsection plates are affixed to each other. The subsection plates are coupled with each other to form a chamber printing assembly that is coupled to the ink jet print head assembly that prints fluid onto one or more objects by ejecting the fluid out of the printing holes of the subsection plates.

In another embodiment, a printing plate assembly for an ink jet print head assembly is provided. The printing plate assembly includes plural planar subsection plates having opposite first and second sides with printing holes extending through a thickness dimension of the subsection plates from the first sides to the second sides. The printing holes in the subsection plates are axially aligned with each other. The subsection plates are bonded together and configured to be coupled to the ink jet print head assembly so that the ink jet print head assembly can print fluid onto one or more objects by forcing the fluid through and out of the printing holes.

In another embodiment, a method (e.g., for creating a printing plate assembly of an ink jet print head assembly) includes coating one or more sides of plural planar subsection plates with a conductive bonding material. The subsection plates include printing holes through which a fluid is to be ejected from an ink jet print head assembly. The method also includes compressing the subsection plates of the printing plate assembly against each other with the printing holes axially aligned with each other, and inductively heating the bonding material between the subsection plates such that the subsection plates are coupled with each other. The subsection plates are coupled with each other to form a chamber printing assembly that is coupled to the ink jet print head assembly that prints fluid onto one or more objects by ejecting the fluid out of the printing holes of the subsection plates.

BRIEF DESCRIPTION OF THE DRAWINGS

The present inventive subject matter will be better understood from reading the following description of non-limiting embodiments, with reference to the attached drawings, wherein below:

FIG. 3 is a partial view of one side of one of the subsection plates shown in FIG. 2 according to one embodiment;

FIG. 4 is a cross-sectional view of a coupling assembly with the subsection plates shown in FIG. 2 disposed in the coupling assembly in accordance with one embodiment;

DETAILED DESCRIPTION

One or more embodiments of the inventive subject matter described herein provide ink jet print head assemblies and associated methods. The print head assemblies can be used to print at relatively rapid speeds and at increased resolutions relative to other known print head assemblies.

Figure 1:
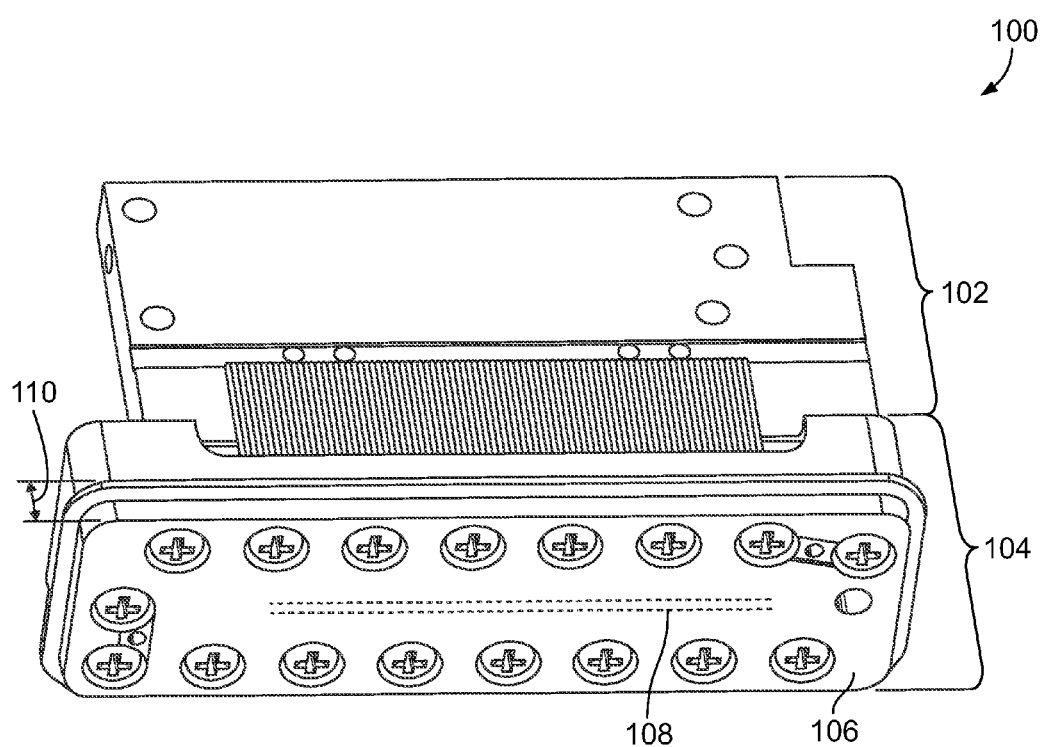
FIG. 1 is a perspective view of an ink jet print head assembly according to one embodiment.

FIG. 1 is a perspective view of an ink jet print head assembly 100 according to one embodiment. The assembly 100 can be used to print ink onto objects (such as packages, boxes, labels, and the like), goods (such as lumber, dry wall, and the like), or other items. As one example, the assembly 100 can print bar codes, labels, or other identifying indicia on objects. Additionally or alternatively, the assembly 100 can print chemicals used in the manufacture of various equipment (e.g., display devices, solar cells, ultraviolet thin films, coatings, or the like), such as by printing polyimides onto glass during the manufacture of display devices (e.g., Liquid Crystal Display screens). The assembly 100 includes a mechanical actuation segment 102 coupled with a fluidic segment 104. The mechanical actuation segment 102 includes various components that move in order to cause a fluid (e.g., an ink or other flowable matter) to be ejected from the assembly 100 and printed onto an object. The fluidic segment 104 includes various components that direct the internal flow of the fluid in the assembly 100 so that the movement occurring in the mechanical actuation segment 102 causes the fluid to be ejected from the assembly 100.

The fluidic segment 104 includes a chamber plate/orifice plate assembly 106, which also may be referred to as a printing plate or printing plate assembly 106. The printing plate assembly 106 includes printing holes 108 extending there through. The mechanical actuation segment 102 generates force on internal chambers having fluid disposed therein. This force causes the fluid to flow through the printing holes 108 and out of the ink jet head printing assembly 100 to be printed onto an object.

In contrast to some known ink jet head printing assemblies 100, the printing plate assembly 106 shown and described herein may be formed from plural separate subsection plates that are bonded together. For example, instead of the chamber plate assembly 106 being formed from a single, continuous body having the printing holes 108 cut or otherwise formed through an entire thickness dimension 110 of the chamber plate assembly 106, the printing plate assembly 106 may be formed from several planar subsection plates that have a smaller thickness dimension than the thickness dimension 110 and that are bonded together to form the printing plate assembly 106.

Figure 2:
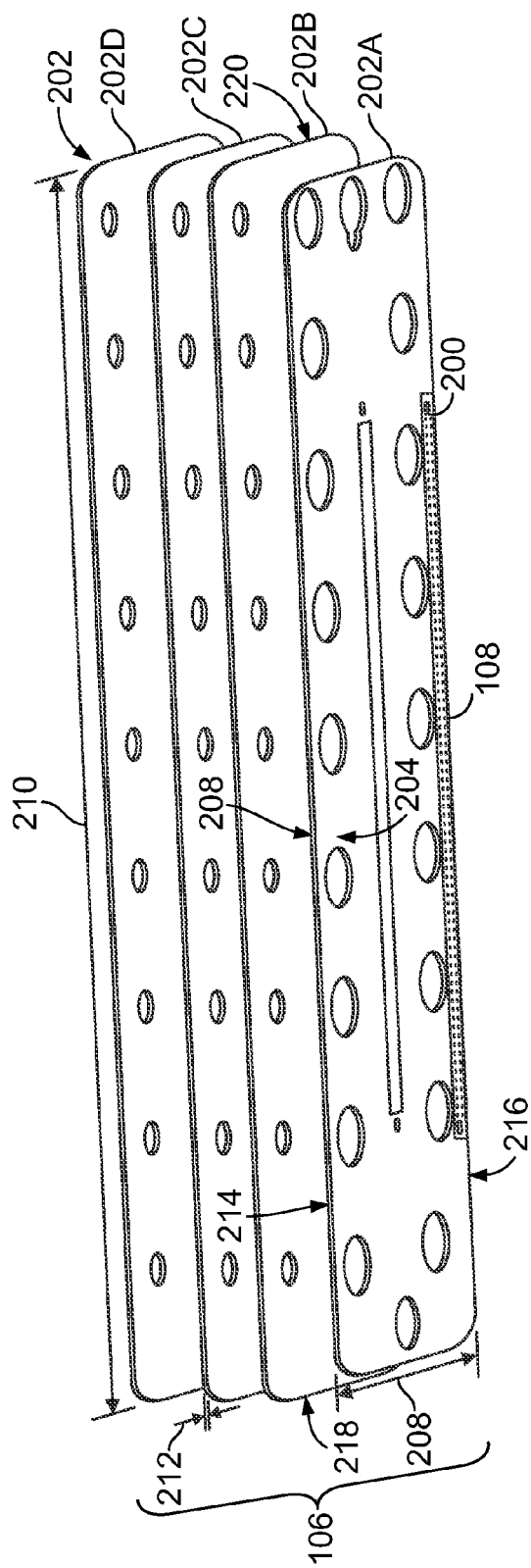
FIG. 2 is an exploded view of a printing plate assembly 106 shown in FIG. 1.

FIG. 2 is an exploded view of the printing plate assembly 106 shown in FIG. 1. As described above, the printing plate assembly 106 includes several separate planar subsection plates or subsection plate bodies 200, 202 (e.g., subsection plates or bodies 200, 202A-D). The subsection plate 200 may be referred to as an orifice plate while the subsection plates 202 may be referred to as subsections of a chamber plate (with the combined subsection plates 202 being referred to as a chamber plate). These subsection plates 200, 202 are bonded together to form the printing plate assembly 106. Each subsection plate 200, 202 may extend between opposite printing and rearward sides 204, 206. The printing side 204 may face the direction of the object that is to be printed onto by the fluid passing through the printing holes 108 of the subsection plates 200, 202. The rearward side 206 faces in an opposite direction, as shown in FIG. 2. The printing holes 108 extend through the subsection plates 200, 202, such as from the rearward side 206 to the printing side 204 of each subsection plate 200, 202. The printing holes 108 are axially aligned with each other when the subsection plates 200, 202 are bonded together such that the fluid can pass through the several printing holes 108 of different subsection plates 200, 202 and out of the printing plate assembly 106. For example, the printing holes 108 may be axially aligned so that the printing holes 108 form separate tubes extending through the several subsection plates 200, 202 when the subsection plates 200, 202 are bonded together.

The subsection plates 200, 202 may be planar bodies in that the subsection plates 200, 202 are significantly larger in two dimensions or directions than in a third dimension or direction. For example, while the subsection plates 200, 202 may include recesses, protrusions, or the like, that extend outside of a plane defined by one or more surfaces of the subsection plates 200, 202, the subsection plates 200, 202 may have outer dimensions that are significantly larger (e.g., at least one order of magnitude or ten times greater) in two directions than in a third direction. In the embodiment shown in FIG. 2, the subsection plates 200, 202 have an outer width dimension 208 that is measured from one elongated edge 214 to an opposite elongated edge 216, an outer length dimension 210 that is measured from one shorter edge 218 to an opposite shorter edge 220 (e.g., the edges 218, 220 are shorter in length than the edges 214, 216), and a thickness dimension 212 that is measured from one side 204 to the opposite side 206 of the subsection plate 200, 202. The width and length dimensions 208, 210 may be significantly larger than the thickness dimension 212. For example, each of the width and length dimensions 208, 210 may be at least an order of magnitude or two longer than the thickness dimension 212 (e.g., at least ten to one hundred times longer). Optionally, the width and/or length dimension 208, 210 may be a different size relative to the thickness dimension 212. In one embodiment, the thickness dimension 212 is no thicker than one inch (e.g., 25.4 millimeters). The thickness dimension 212 may be at least at thick as 0.0005 inches (e.g., 12.7 microns). Optionally, the thickness dimension 212 can be another size.

The subsection plate 200 may be referred to as an orifice plate. The subsection plate 200 may be the outer subsection plate 200 of the printing plate assembly 106 that faces the objects that are printed on by the ink jet print head assembly 106. The subsection plates 202 may be referred to as interior plates as these subsection plates 202 are disposed between the outer subsection plate 200 and the mechanical actuation segment 102 (shown in FIG. 1) of the ink jet print head assembly 100.

The subsection plates 200, 202 may be formed by machining the separate plates 200, 202 from larger bodies of material. For example, one or more of the subsection plates 200, 202 may be cut from a larger block of stainless steel or another material. Optionally, one or more of the subsection plates 200, 202 may be formed from a non-conductive material, such as a polymer, ceramic, or semi-conductor material (such as silicon). In another example, one or more of the subsection plates 200, 202 may be electroformed. Non-limiting examples of the materials that may be used to form one or more of the subsection plates 200, 202 include graphite, aluminum (Al), copper (Cu), an alloy that includes aluminum (Al), an alloy that includes copper (Cu), an alloy that includes both aluminum (Al) and copper (Cu), semi-conductor materials such as silicon (Si), another alloy, a polymer, a ceramic, semi-conductors, and the like. The printing holes 108 may be formed through the subsection plates 200, 202 by etching the holes 108 through theplates 200, 202, or by another technique. Use of thinner subsection plates 200, 202 can allow for the printing holes 108 to be chemically etched through the subsection plates 200, 202, whereas larger bodies (e.g., a continuous chamber plate that is not formed from the subsection plates 200, 202) may be too thick to allow for chemical (or other) etching of the printing holes 108.

In order to create the printing plate assembly 106, one or both of the sides 204, 206 of the subsection plates 200, 202 are at least partially coated with a bonding material. This bonding material may be a conductive material, such as a metal or metal alloy. Examples of acceptable bonding materials include tin (Sn), indium (In), gold (Au), lead (Pb), silver (Ag), nickel (Ni), palladium (Pd), platinum (Pt), zinc (Zn), bismuth (Bi), an alloy that includes one or more of these conductive materials, or the like. In one aspect, for one pair of subsection plates that are bonded together, at least one side of the plates (that is bonded to the other plate) is coated with a bonding material formed from tin (Sn), indium (In), or lead (Pb). The bonding material may be coated on the subsection plates 200, 202 in relatively small thicknesses, such as between 0.5 and 10 microns, or another thickness. The subsection plates 200, 202 can be placed next to each other and inductively heated (as described in more detail below) to cause the bonding material to at least partially melt. The bonding material is then allowed to solidify and thereby bond the subsection plates 200, 202 to each other and form the printing plate assembly 106.

FIG. 3 is a partial view of one side 204 of one of the subsection plates 202 shown in FIG. 2 according to one embodiment. Optionally, FIG. 3 may illustrate the opposite side 206 of the subsection plate 202. As shown in FIG. 3, the printing holes 108 extend through the entire thickness dimension of the subsection plate 202. The printing holes 108 are arranged in two lines extending along the length dimension of the subsection plate 202. Optionally, the printing holes 108 may be arranged in a single line, more than two lines, or in another arrangement. The printing holes 108 in the other subsection plates 200, 202 also may be arranged in a similar or identical manner so that the printing holes 108 in the subsection plates 200, 202 are axially aligned with each other when the subsection plates 200, 202 are bonded together to form the printing plate assembly 106.

In the illustrated example, the body of the subsection plate 202 includes several recesses 300, 302 that extend into, but not all the way through, the subsection plate 202 from the side 204. Optionally, one or more of the recesses 300, 302 may extend into the subsection plate 202 from the side 206. Alternatively, one or more of the recesses 300, 302 may extend through the entire thickness dimension of the subsection plate 202. The number, shapes, sizes, and/or arrangements of the recesses 300, 302 are provided as examples, and other numbers, shapes, sizes, and/or arrangements of the recesses 300 and/or 302 may be used.

As described herein, the subsection plates 200, 202 may be at least partially coated with a bonding material that couples the subsection plates 200, 202 with each other to form the printing plate assembly 106. This bonding material is at least partially melted to affix the plates 200, 202 with each other. The printing holes 108 are relatively small in diameter and/or have relatively small aspect ratios (e.g., the ratio of the diameter or width of the printing holes 108 to the thickness dimension of the subsection plate 200, 202). In order to prevent or reduce the possibility of the melted bonding material from clogging one or more of the printing holes 108 during the bonding of the subsection plates 200, 202 to each other, the recesses 300 and/or 302 are provided to collect at least some of this melted bonding material. For example, the recesses 300, 302 that at least partially encircle a printing hole 108 may receive some of the melted bonding material to prevent this material from entering into and clogging the printing hole 108 such that fluid cannot pass through the printing hole 108. Alternatively, one or more of the subsection plates 200, 202 may not include the recesses 300 and/or 302.

Figure 5:
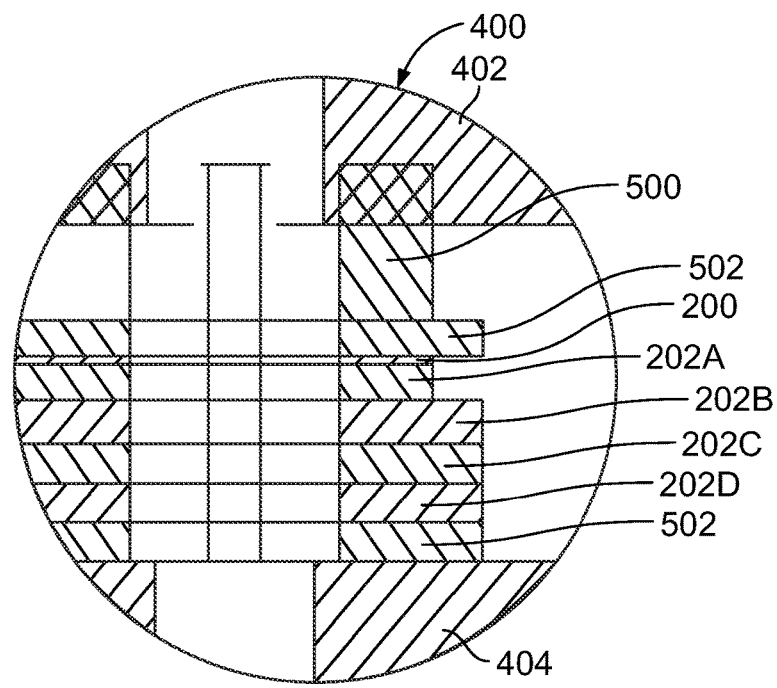
FIG. 5 is a detail view of ends of the subsection plates shown in FIG. 2 in the coupling assembly of FIG. 4.

FIG. 4 is a cross-sectional view of a coupling assembly 400 with the subsection plates 200, 202 disposed in the coupling assembly 400 in accordance with one embodiment. FIG. 5 is a detail view of ends of the subsection plates 200, 202 in the coupling assembly 400 shown in FIG. 4. The coupling assembly 400 includes compression bodies 402, 404 that face each other with the subsection plates 200, 202 sandwiched together between the bodies 402, 404. As shown in FIG. 5, an elastomeric plate 500 may be positioned between at least one of the compression bodies 402, 404 and the subsection plates 200, 202. The elastomeric plate 500 can be formed of an elastomeric material, such as silicone, to provide a uniform pressure distribution on the subsection plates 200, 202. For example, the compression bodies 402, 404 may be forced toward each other to apply a compressive force on the subsection plates 200, 202 disposed there between. If one or more of the compression bodies 402, 404 and/or subsection plates 200, 202 are not exactly parallel to the other compression bodies 402, 404 and/or subsection plates 200, 202, the compression bodies 402, 404 may generate increased compressive force on segments of the plates 200, 202 that are closer to the bodies 402, 404 than other segments of the plates 200, 202. The elastomeric plate 500 can absorb this excess compression so that the compressive force is more evenly distributed across the entirety of the sides 204, 206 (shown in FIG. 2) of the plates 200, 202. Optionally, the elastomeric plate 500 may not be used.

In the illustrated embodiment, a tooling plate 502 is disposed between the elastomeric plate 500 and the subsection plates 200, 202. The tooling plate 502 may be a rigid body, such as a body formed from stainless steel or another material, that transfers the compressive force applied onto the elastomeric body 500 to the subsection plates 200, 202. The tooling plate 502 also can prevent the subsection plates 200, 202 from bonding to the elastomeric plate 500 and/or the compression body 402. For example, the bonding material that coats the subsection plate 200 may melt and solidify between the subsection plate 200 and the tooling plate 502. The material of the tooling plate 502 may prevent the bonding material from adhering to the tooling plate 502 and/or may enable relatively easy separation of the tooling plate 502 from the subsection plate 200 after the bonding material has solidified. Optionally, the tooling plate 502 may not be included.

One or more sides 204, 206 of the subsection plate 200 is coated with the bonding material. The interface between the subsection plate 200 and the tooling plate 502 in FIG. 5 can represent this bonding material on the side 204 or the side 206. The subsection plate 200 is placed in contact with (e.g., directly abuts) the tooling plate 502 in the illustrated embodiment. One or more of the sides 204, 206 of the subsection plates 202A-D also are coated with the bonding material and the subsection plates 200, 202 are placed into direct contact with each other, as shown in FIG. 5. The interfaces between adjacent pairs of the plates 200, 202 can represent the bonding material on the sides 204, 206 in FIG. 5. Another tooling plate 502 may be positioned between the subsection plates 202 and the compression body 404.

The compression bodies 402, 404 can be pressed together, such as by threading a screw or other mechanism between the bodies 402, 404 to pull the bodies 402, 404 toward each other. Optionally, the bodies 402, 404 may be forced together by one or more other components. The compression bodies 402, 404 and the subsection plates 200, 202 are then placed into an inductive heating chamber system to inductively heat the bonding material on the subsection plates 200, 202.

Figure 6:
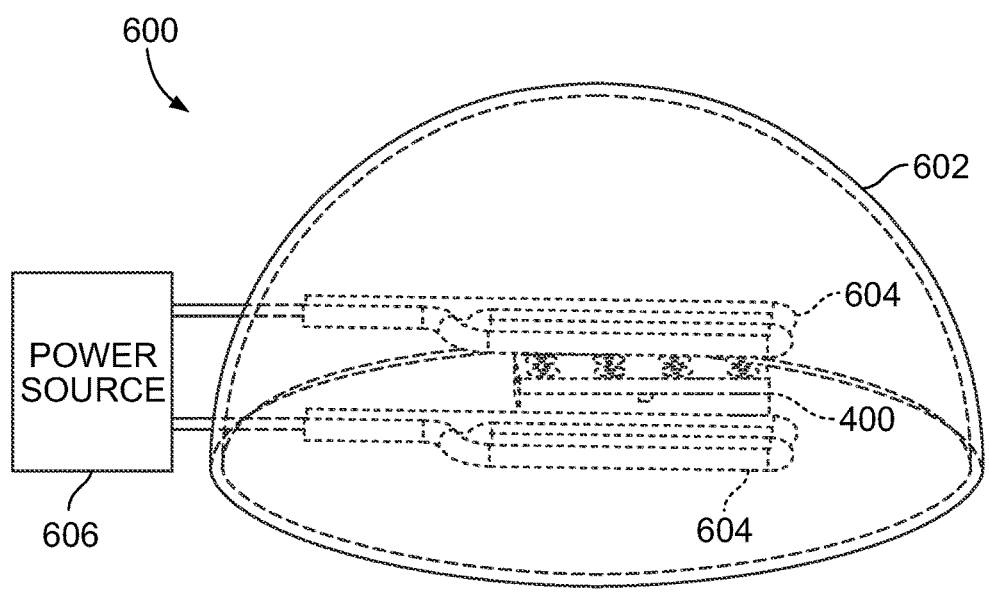
FIG. 6 is a schematic diagram of an inductive heating chamber system in accordance with one embodiment.

FIG. 6 is a schematic diagram of an inductive heating chamber system 600 in accordance with one embodiment. The system 600 includes a chamber 602 in which one or more inductive heating coils 604 are positioned. In the illustrated example, the coils 604 are planar coils in that the coils 604 are generally disposed within separate parallel planes. The coupling assembly 400 with the subsection plates 200, 202 (shown in FIG. 2) disposed therein is positioned between the coils 604.

Figure 7:
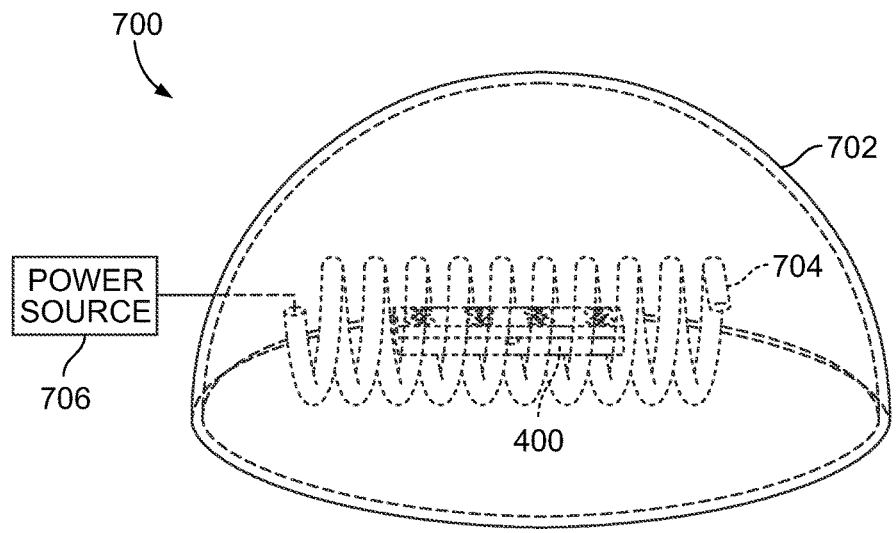
FIG. 7 is a schematic diagram of an inductive heating chamber system in accordance with another embodiment.

FIG. 7 is a schematic diagram of an inductive heating chamber system 700 in accordance with another embodiment. The system 700 includes a chamber 702 in which one or more inductive heating coils 704 are positioned. In the illustrated example, the coil 704 is a spiral or circular coil that defines a path that extends around the coupling assembly 400, such as along a helical path. Optionally, the coil 704 may extend around the coupling assembly 400 along another path. While the coils 604 shown in FIG. 6 may substantially extend in two dimensions (e.g., along width and length directions, or along x- and y-directions), the coil 704 may extend in three dimensions (e.g., along width, length, and height directions, or along x-, y-, and z-directions). The coil 704 may perform better in inductively heating and bonding three dimensional or irregularly shaped components relative to the coils 604 in one embodiment. The coupling assembly 400 with the subsection plates 200, 202 (shown in FIG. 2) disposed therein is positioned inside the space that the coil 704 extends around or otherwise encircles.

With continued reference to the systems 600, 700 shown in FIGS. 6 and 7, the pressure in the chamber 602, 702 may be reduced, such as to a vacuum, when the coupling assembly 400 is disposed in the chamber 602, 702. In one example, the pressure in the chamber 602, 702 is reduced to 0.01 pounds per square inch (psi) (e.g., 68.9 Pascals) or lower. Optionally, the pressure may be reduced to a greater pressure that is a sub-atmospheric pressure. The available space inside the chamber 602, 702 may be filled or at least partially filled with an inert gas, such as argon (Ar), nitrogen ($N_2$), or the like. Alternatively, the pressure inside the chamber 602, 702 may not be reduced, but the gaseous contents of the chamber 602, 702 may be replaced with the inert gas.

In one embodiment, the systems 600, 700 are used to bond the subsection plates 200, 202 (shown in FIG. 2) of the plate assembly 106 (shown in FIG. 1) by inductively heating the bonding materials on the subsection plates 200, 202 to a sufficiently large temperature that the bonding materials melt. The systems 600, 700 can melt the bonding materials by inductively heating the bonding materials directly or indirectly. Directly heating the bonding materials includes applying an electric current to the coils 604, 704 at relatively high frequencies to cause the bonding materials themselves to be heated, as opposed to heating a gaseous atmosphere surrounding the bonding materials and/or heating the bodies of the subsection plates 200, 202, which also results in increasing the temperature of the nearby bonding materials.

In order to directly heat the bonding materials, a power source 606, 706 (e.g., a controller, switch, and/or computer that controls supply of electric current) provides electric current to the coils 604, 704 at frequencies that are greater than 500 kilohertz. Optionally, lower frequencies may be used. While relatively small portions of the bodies of the subsection plates 200, 202 also may be inductively heated at such frequencies, the substantial portion of the energy that is inductively transferred from the coils 604, 704 is transferred to the bonding materials and not the subsection plates 200, 202. For example, the entirety of the bonding materials may be heated while less than the entirety of the subsection plates 200, 202 is heated.

The coils 604, 704 inductively heat the bonding materials to sufficiently large temperatures that the bonding materials melt. For example, the bonding materials may change phases from a solid material to a fluid or liquid material. The bonding materials are heated such that the bonding materials begin to flow between the subsection plates 200, 202. Use of inductive heating to melt the bonding materials can allow for the bonding materials to be melted relatively quickly, such as within five minutes. Alternatively, the bonding materials may be melted within a shorter time period, such as within ten seconds or less, five seconds or less, three seconds or less, and the like. Increasing the power of the electric current applied to the coils 604, 704 can increase the rate at which the bonding materials are heated and melted.

The systems 600, 700 can increase the temperature of the bonding materials to temperatures that are greater than the melting temperatures or points of the bonding materials. For example, if the bonding materials are formed from tin (Sn), then the systems 600, 700 can inductively heat the bonding materials up to 260 degrees Celsius, or a temperature that is at least 231.9 degrees Celsius (e.g., the melting temperature of tin). If the bonding materials are formed from indium (In), then the systems 600, 700 can inductively heat the bonding materials up to 180 degrees Celsius, or a temperature that is at least 156.6 degrees Celsius. Optionally, one or more other temperatures may be used.

The elevated temperature of the bonding materials can be held for a designated time period to allow the bonding materials to bond the adjacent subsection plates 200, 202 with each other. For example, once the bonding materials are inductively heated to a designated temperature that results in the bonding materials melting, the bonding materials may be held at this (or another) temperature for at least five seconds, or another time period. The designated time period may be selected so that the melted bonding materials have sufficient time to chemically bond with the subsection plates 200, 202, while not being so long of a time period that the melted bonding materials extend into and block one or more of the printing holes 108 (shown in FIG. 1) in the subsection plates 200, 202.

As described above, the chamber 602, 702 may be high vacuum (such as $10^{-6}$ torr), low vacuum (such as $10^{-2}$ torr), or at least partially filled with a gas, such as an inert gas. If the bonding materials are to be inductively melted to bond the subsection plates 200, 202 together, then a clamping pressure applied on the plates between 400 and 404 can be at least 100 psi (e.g., 700 kilopascals) during heating, or another pressure. In one aspect, the pressure is maintained to be no greater than 500 psi (e.g., 3,500 kilopascals), or another pressure.

Use of inductive heating to melt the bonding materials and couple the subsection plates 200, 202 with each other can result in the plates 200, 202 being bonded to each other relatively quickly without clogging the printing holes 108. For example, inductively heating the relatively small mass of the bonding material to a temperature at which the bonding material melts may occur relatively quickly, such as within three seconds, five seconds, ten seconds, or another time period. The relatively small mass of the bonding material also may bond the plates 200, 202 and cool relatively quickly once the inductive heating is terminated. Consequently, the entire process of heating, melting, and then cooling the bonding material can occur within seconds (e.g., less than ten seconds, less than five seconds, or less than another relatively short time period). This relatively short time period can prevent the melted bonding material from flowing into the printing holes 108. Conversely, if the bonding materials were heated by placing the subsection plates 200, 202 and bonding materials in a heated atmosphere (e.g., an oven), the bonding materials may be exposed to elevated temperatures for a much longer time period, such as the time period needed to heat the space surrounding the subsection plates 200, 202 and bonding materials, the time period to heat and melt the bonding material, and the time period needed to allow the subsection plates 200, 202 and bonding material to cool. The total time period that may be needed can be sufficiently long that the melted bonding material can flow into the printing holes 108 and cool within the printing holes 108. As a result, the bonding material may block or restrict the flow of fluid through the printing holes 108 during printing. The relatively short time period involved in melting the bonding material using inductive heating, however, can be sufficiently short that the bonding material melts without flowing into the printing holes 108.

In another embodiment, the bonding materials can bond the subsection plates 200, 202 to each other without melting the bonding material. For example, the coupling assembly 400 with the subsection plates 200, 202 and the bonding material may be heated to one or more temperatures below the melting temperature of the bonding material, but at temperatures that are sufficiently elevated to cause the bonding material to diffuse into the adjacent subsection plates 200, 202. The bonding material disposed between two adjacent subsection plates 200, 202 can diffuse into these adjacent subsection plates 200, 202 to bond the adjacent subsection plates 200, 202 to each other. As one example, a bonding material formed from tin (Sn) can be heated to a temperature that is no greater than 230 degrees Celsius (or another temperature). A bonding material formed from indium (In) can be heated to a temperature that is no greater than 150 degrees Celsius (or another temperature). Optionally, another temperature may be used. The heating of the bonding material may be completed using inductive heating, as described above. Alternatively, another method of heating may be used, such as heating the subsection plates 200, 202 and bonding material in an oven.

The bonding material may be held at or above this elevated temperature (which can be referred to as a diffusing temperature) that is less than the melting temperature of the bonding material for a designated time period. This time period may be longer than is used for inductive heating of the bonding material to melt the bonding material, as described above. For example, the bonding material may be heated to an elevated temperature below the melting temperature for at least thirty minutes but no more than three hours. Optionally, another minimum and/or maximum time period may be used.

If the bonding materials are to be heated in order to diffuse the bonding materials into the adjacent subsection plates 200, 202, then the pressure applied on the plates during heating between 400 and 404 can be increased to at least 1000 psi (e.g., 6,900 kilopascals), or another pressure. In one aspect, the pressure is maintained to be no greater than 4,000 psi (e.g., 27,500 kilopascals), or another pressure.

Once the bonding material has melted or diffused, and bonded the subsection plates 200, 202 together, the coupling assembly 400 may be removed from the system 600, 700. The subsection plates 200, 202 may then be removed from the coupling assembly 400. The subsection plates 200, 202 that are bonded together form the plate assembly 106 shown in FIG. 1. The plate assembly 106 may then be connected to an ink jet print head assembly for printing on one or more objects, as described above.

Figure 8:
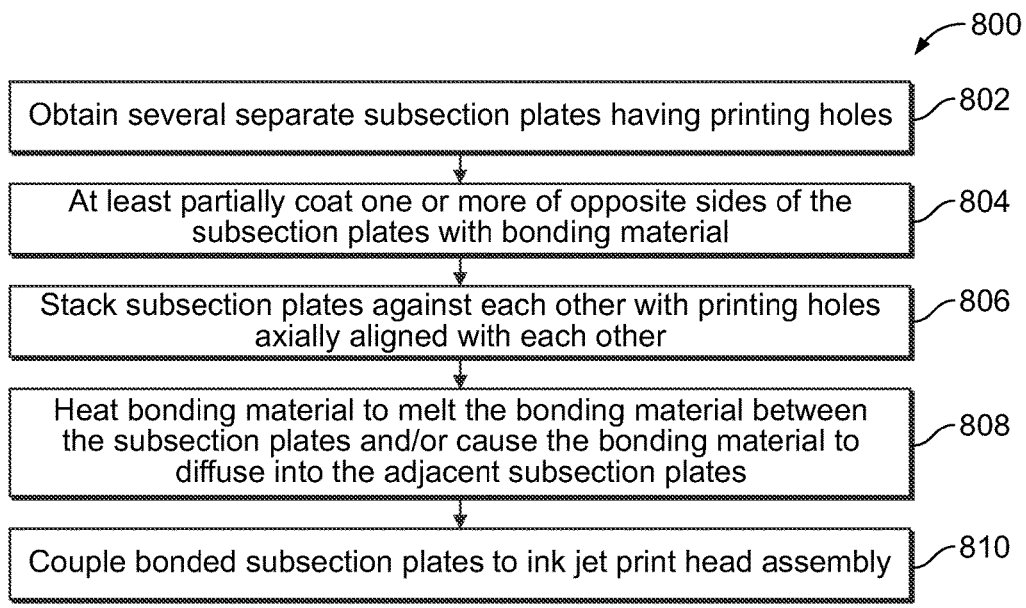
FIG. 8 illustrates a flowchart of a method for forming a chamber plate assembly of an ink jet print head assembly in accordance with one or more embodiments.

FIG. 8 illustrates a flowchart of a method 800 for forming a printing plate assembly of an ink jet print head assembly in accordance with one or more embodiments. The method 800 may be used to fabricate the chamber printing plate 106 shown in FIG. 1. At 802, several separate subsection plates 200, 202 (shown in FIG. 2) are obtained. The subsection plates 200, 202 may be machined from a larger block of material with the printing holes 108 (shown in FIG. 1) cut and/or etched through the subsection plates 200, 202. Optionally, the subsection plates 200, 202 may be electroformed or otherwise created.

At 804, one or more opposite sides 204, 206 (shown in FIG. 2) of the subsection plates 200, 202 are at least partially coated with a bonding material. As described above, the bonding material may be used to adhere adjacent subsection plates 200, 202 to each other. The bonding material may be sputtered or otherwise deposited onto one or more of the sides 204, 206 of the subsection plates 200, 202.

At 806, the subsection plates 200, 202 with the bonding material at least partially coated thereon are stacked onto each other. For example, the subsection plates 200, 202 may be placed against each other so that one or both of the sides 204, 206 of the subsection plates 200, 202 abuts the side 204, 206 of one or more other subsection plates 200, 202. The subsection plates 200, 202 are aligned with each other such that the printing holes 108 in one subsection plate 200, 202 is axially aligned with the corresponding printing holes 108 in the other subsection plates 200, 202.

At 808, the bonding material between adjacent ones of the subsection plates 200, 202 is heated. The bonding material may be heated so that the bonding material melts between the subsection plates 200, 202 and affixes the subsection plates 200, 202 to each other. Alternatively, the bonding material may be heated, but not melted, so that the bonding material diffuses into the bodies of the subsection plates 200, 202 and affixes the subsection plates 200, 202 to each other. As described above, the bonding material may be heated using one or more techniques, such as inductive heating or another technique. In one embodiment, the bonding material can seal the subsection plates 200, 202 together, such as by hermetically sealing the subsection plates 200, 202 against each other.

At 810, the subsection plates 200, 202 that are bonded together form the chamber printing assembly 106 and can be coupled with the ink jet print head assembly 100. The ink jet print head assembly 100 may then print a fluid onto one or more objects, such as the forcing ink through the chamber printing assembly 106 and out of the chamber printing assembly 106 via the printing holes 108.

In one embodiment, a method (e.g., for creating a printing plate assembly of an ink jet print head assembly) includes coating one or more sides of plural planar subsection plates with a bonding material. The subsection plates include printing holes through which a fluid is to be ejected from an ink jet print head assembly. The method also includes placing the subsection plates of the printing plate assembly against each other with the printing holes axially aligned with each other and heating the bonding material between the subsection plates such that the subsection plates are affixed to each other. The subsection plates are coupled with each other to form a chamber printing assembly that is coupled to the ink jet print head assembly that prints fluid onto one or more objects by ejecting the fluid out of the printing holes of the subsection plates.

In one aspect, the bonding material hermetically bonds the subsection plates with each other.

In one aspect, the bonding material is heated by inductively heating the bonding material.

In one aspect, the bonding material is inductively heated to a temperature above a melting temperature of the bonding material within five minutes.

In one aspect, the subsection plates are inductively heated and cooled sufficiently fast that the bonding material does not flow into the printing holes of the subsection plates.

In one aspect, heating the bonding material includes heating the bonding material to a temperature that is at least as high as a melting temperature of the bonding material so that the bonding material melts between the subsection plates.

In one aspect, heating the bonding material includes heating the bonding material to a temperature that is less than a melting temperature of the bonding material so that the bonding material diffuses into the subsection plates without melting.

In one aspect, one or more of the bonding material or the subsection plates include a conductive material.

In one aspect, the conductive material includes at least one of tin (Sn), indium (In), or an alloy that includes at least one of tin or indium.

In one aspect, the bonding material includes one or more of tin (Sn), indium (In), gold (Au), lead (Pb), silver (Ag), nickel (Ni), palladium (Pd), platinum (Pt), zinc (Zn), bismuth (Bi), or an alloy that includes one or more of these conductive materials.

In one aspect, coating the one or more sides of the subsection plates includes selectively coating less than all of the subsection plates.

In one aspect, the method also includes forming reflow recesses extending into bodies of one or more of the subsection plates. The reflow recesses are positioned such that at least a portion of the bonding material flows into one or more of the reflow recesses instead of the printing holes when the bonding material is heated.

In another embodiment, a printing plate assembly for an ink jet print head assembly is provided. The printing plate assembly includes plural planar subsection plates having opposite first and second sides with printing holes extending through a thickness dimension of the subsection plates from the first sides to the second sides. The printing holes in the subsection plates are axially aligned with each other. The subsection plates are bonded together and configured to be coupled to the ink jet print head assembly so that the ink jet print head assembly can print fluid onto one or more objects by forcing the fluid through and out of the printing holes.

In one aspect, the subsection plates are bonded together by a bonding material that was melted between the subsection plates.

In one aspect, the subsection plates are bonded together by a bonding material that diffused into the subsection plates.

In one aspect, one or more of the subsection plates are coupled by a bonding material that includes a conductive material, the subsection plates are formed from the conductive material, or the bonding material is an adhesive.

In one aspect, the subsection plates are formed from a nonconductive material.

In one aspect, the subsection plates are formed from a conductive material.

In one aspect, one or more of the subsection plates include reflow recesses extending into bodies of the one or more of the subsection plates. The reflow recesses are positioned such that at least a portion of a bonding material used to couple the subsection plates with each other flows into one or more of the reflow recesses instead of the printing holes when the bonding material is melted.

In another embodiment, a method (e.g., for creating a printing plate assembly of an ink jet print head assembly) includes coating one or more sides of plural planar subsection plates with a conductive bonding material. The subsection plates include printing holes through which a fluid is to be ejected from an ink jet print head assembly. The method also includes compressing the subsection plates of the printing plate assembly against each other with the printing holes axially aligned with each other, and inductively heating the bonding material between the subsection plates such that the subsection plates are coupled with each other. The subsection plates are coupled with each other to form a chamber printing assembly that is coupled to the ink jet print head assembly that prints fluid onto one or more objects by ejecting the fluid out of the printing holes of the subsection plates.

In one aspect, the bonding material is heated without heating a bulk of bodies of the subsection plates.

In one aspect, inductively heating the bonding material includes melting the bonding material between the subsection plates.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure. For example, the recitation of a "mechanism for," "module for," "device for," "unit for," "component for," "element for," "member for," "apparatus for," "machine for," or "system for" is not to be interpreted as invoking 35 U.S.C. § 112(f) and any claim that recites one or more of these terms is not to be interpreted as a means-plus-function claim.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

The invention claimed is:

1. A method comprising:
coating one or more sides of plural planar subsection plates with a conductive bonding material, the subsection plates including printing holes through which a fluid is to be ejected from an ink jet print head assembly;

placing the subsection plates of the printing plate assembly against each other with the printing holes axially aligned with each other;

applying a pressure of at least 1,000 pounds per square inch to the subsection plates; and heating the bonding material to a temperature that is less than a melting temperature of the bonding material so that the bonding material diffuses into the subsection plates without melting by applying an electric current to conductive coils that are outside of the subsection plates at a frequency that is greater than 500 kilohertz, the bonding material diffusing into the subsection plates such that the subsection plates are affixed to each other, wherein the subsection plates are coupled with each other to form a chamber printing assembly that is coupled to the ink jet print head assembly that prints fluid onto one or more objects by ejecting the fluid out of the printing holes of the subsection plates.

2. The method of claim 1, wherein the bonding material hermetically bonds the subsection plates with each other.

3. The method of claim 1, wherein the bonding material is heated by inductively heating the bonding material.

4. The method of claim 3, wherein the bonding material is inductively heated to a temperature above a melting temperature of the bonding material within five minutes.

5. The method of claim 3, wherein the subsection plates are inductively heated and cooled sufficiently fast that the bonding material does not flow into the printing holes of the subsection plates.

6. The method of claim 1, wherein one or more of the bonding material or the subsection plates include a conductive material.

7. The method of claim 6, wherein the conductive material includes at least one of tin (Sn), indium (In), or an alloy that includes at least one of tin or indium.

8. The method of claim 1, wherein the bonding material includes one or more of tin (Sn), gold (Au), lead (Pb), silver (Ag), nickel (Ni), palladium (Pd), platinum (Pt), zinc (Zn), bismuth (Bi), or an alloy that includes one or more of these conductive materials.

9. The method of claim 1, wherein coating the one or more sides of the subsection plates includes selectively coating less than all of the subsection plates.

10. The method of claim 1, further comprising forming reflow recesses extending into bodies of one or more of the subsection plates, wherein the reflow recesses are positioned such that at least a portion of the bonding material flows into one or more of the reflow recesses instead of the printing holes when the bonding material is heated.

11. The method of claim 1, wherein placing the subsection plates against each other includes compressing the subsection plates of the printing plate assembly against each other with the printing holes axially aligned with each other.

12. A method comprising:

coating one or more sides of plural planar subsection plates with a conductive bonding material, the subsection plates including printing holes through which a fluid is to be ejected from an ink jet print head assembly;

compressing the subsection plates of the printing plate assembly against each other with the printing holes axially aligned with each other by applying a pressure of at least 1,000 pounds per square inch to the subsection plates; and inductively heating the bonding material between the subsection plates to a temperature that is less than a melting temperature of the bonding material so that the bonding material diffuses into the subsection plates without melting, the bonding material inductively heated by applying an electric current to conductive coils that are outside of the subsection plates at a frequency that is greater than 500 kilohertz, the bonding material diffusing into the subsection plates such that the subsection plates are coupled with each other, wherein the subsection plates are coupled with each other to form a chamber printing assembly that is coupled to the ink jet print head assembly that prints fluid onto one or more objects by ejecting the fluid out of the printing holes of the subsection plates.

13. The method of claim 12, wherein the bonding material is heated without heating a bulk of bodies of the subsection plates.

14. The method of claim 12, wherein coating the one or more sides of the subsection plates with the conductive bonding material includes coating less than an entirety of each of the one or more sides of the subsection plates.

* * * * *